United States Patent
Goodridge et al.

(10) Patent No.: US 11,720,712 B2
(45) Date of Patent: *Aug. 8, 2023

(54) MANAGING REGISTRY ACCESS ON A COMPUTER DEVICE

(71) Applicant: Avecto Limited, Manchester (GB)

(72) Inventors: John Goodridge, Cheshire (GB); Ian James McLean, Cheshire (GB)

(73) Assignee: Avecto Limited, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,053

(22) Filed: May 3, 2022

(65) Prior Publication Data

US 2022/0261504 A1  Aug. 18, 2022

Related U.S. Application Data

(63) Continuation of application No. 16/272,266, filed on Feb. 11, 2019, now Pat. No. 11,366,931.

(30) Foreign Application Priority Data

Feb. 12, 2018 (GB) ...................................... 1802241

(51) Int. Cl.
    *G06F 21/62* (2013.01)
    *G06F 12/14* (2006.01)
    *G06F 21/60* (2013.01)

(52) U.S. Cl.
    CPC ...... *G06F 21/6281* (2013.01); *G06F 12/1416* (2013.01); *G06F 12/1466* (2013.01);
    (Continued)

(58) Field of Classification Search
    CPC .............. G06F 21/6281; G06F 21/604; G06F 12/1416; G06F 12/1466; G06F 2221/2101; G06F 2221/2141; G06F 2221/2149
    See application file for complete search history.

(56) References Cited

U.S. PATENT DOCUMENTS 5,881,225 A    3/1999  Worth
5,991,542 A   11/1999  Han et al.
(Continued)

FOREIGN PATENT DOCUMENTS

EP   2750035 A1   7/2014
GB   2486528 B    9/2016
(Continued)

OTHER PUBLICATIONS

Chris Hoffman and Justin Pot; "How to Install Applications on a Mac: Everything You Need to Know"; HowToGeek.com website [full url in ref.]; Jul. 20, 2017 (Year: 2017).
(Continued)

*Primary Examiner* — Hosuk Song
(74) *Attorney, Agent, or Firm* — Morris, Manning & Martin, LLP; Daniel E. Sineway, Esq.; Adam J. Thompson, Esq.

(57) ABSTRACT

A computer device performs operations for managing registry access, including monitoring a user process on the computer device. The computing device can determine a set of registry access rules relevant to the user process. The computing device can perform an evaluation of a registry operation requested by the user process using the set of registry access rules. The computing device can determine an action based on the evaluation. The action can include one of blocking the registry operation in relation to a particular key in a registry of the operating system, and enabling access to a particular key in the registry of the operating system to perform the requested registry operation.

20 Claims, 8 Drawing Sheets

(52) U.S. Cl.
CPC .... *G06F 21/604* (2013.01); *G06F 2221/2101* (2013.01); *G06F 2221/2141* (2013.01); *G06F 2221/2149* (2013.01)

(56) References Cited

U.S. PATENT DOCUMENTS

| | | | |
|---|---|---|---|
| 6,233,618 B1 | 5/2001 | Shannon | |
| 6,505,300 B2* | 1/2003 | Chan | G06F 21/53 709/229 |
| 7,133,904 B1 | 11/2006 | Soyha et al. | |
| 7,219,354 B1 | 5/2007 | Huang et al. | |
| 7,725,922 B2* | 5/2010 | Pouliot | G06F 21/53 709/208 |
| 7,853,947 B2* | 12/2010 | Laborczfalvi | G06F 21/10 718/1 |
| 7,962,918 B2* | 6/2011 | Schaefer | G06F 21/6281 707/694 |
| 8,368,640 B2 | 2/2013 | Dardinski et al. | |
| 9,158,662 B1 | 10/2015 | Hanes et al. | |
| 9,769,131 B1 | 9/2017 | Hartley | |
| 9,953,189 B2* | 4/2018 | Cook | G06F 21/6281 |
| 10,769,275 B2* | 9/2020 | Licata | G06F 21/554 |
| 10,803,499 B1 | 10/2020 | Davis et al. | |
| 11,113,393 B2* | 9/2021 | Vajravel | G06F 21/54 |
| 11,366,931 B2* | 6/2022 | Goodridge | G06F 21/6281 |
| 2002/0144137 A1 | 10/2002 | Harrah et al. | |
| 2002/0174256 A1 | 11/2002 | Bonilla et al. | |
| 2004/0210771 A1 | 10/2004 | Wood et al. | |
| 2005/0188370 A1 | 8/2005 | Kouznetsov et al. | |
| 2006/0089834 A1 | 4/2006 | Mowatt et al. | |
| 2007/0180502 A1 | 8/2007 | Yadav et al. | |
| 2007/0198933 A1 | 8/2007 | van der Bogert et al. | |
| 2008/0060051 A1 | 3/2008 | Barton et al. | |
| 2008/0289026 A1 | 11/2008 | Abzarian et al. | |
| 2009/0070442 A1 | 3/2009 | Kacin et al. | |
| 2010/0274366 A1 | 10/2010 | Fata et al. | |
| 2011/0030045 A1 | 2/2011 | Beauregard et al. | |
| 2011/0173251 A1 | 7/2011 | Sandhu et al. | |
| 2011/0196842 A1 | 8/2011 | Timashev et al. | |
| 2011/0239288 A1 | 9/2011 | Cross et al. | |
| 2011/0251992 A1 | 10/2011 | Bethlehem et al. | |
| 2012/0047259 A1 | 2/2012 | Krasser et al. | |
| 2012/0054744 A1 | 3/2012 | Singh et al. | |
| 2012/0066512 A1 | 3/2012 | Kass et al. | |
| 2012/0226742 A1 | 9/2012 | Mornchilov et al. | |
| 2013/0057561 A1 | 3/2013 | Nave et al. | |
| 2013/0339313 A1 | 12/2013 | Blaine et al. | |
| 2014/0279600 A1 | 9/2014 | Chait | |
| 2014/0281528 A1 | 9/2014 | Dubey et al. | |
| 2015/0058839 A1 | 2/2015 | Madanapalli et al. | |
| 2015/0074828 A1 | 3/2015 | Beauregard et al. | |
| 2015/0128250 A1 | 5/2015 | Lee et al. | |
| 2016/0203313 A1 | 7/2016 | El-Moussa et al. | |
| 2016/0217159 A1 | 7/2016 | Dahan et al. | |
| 2016/0378962 A1 | 12/2016 | Austin | |
| 2017/0011220 A1 | 1/2017 | Efremov et al. | |
| 2017/0048259 A1 | 2/2017 | Dodge et al. | |
| 2017/0054760 A1 | 2/2017 | Barton et al. | |
| 2017/0111368 A1 | 4/2017 | Hibbert et al. | |
| 2018/0024895 A1 | 1/2018 | Kumarasamy et al. | |
| 2018/0302409 A1 | 10/2018 | Hope | |
| 2019/0121631 A1 | 4/2019 | Hua et al. | |

FOREIGN PATENT DOCUMENTS

| | | |
|---|---|---|
| GB | 2538518 A | 11/2016 |
| GB | 2563066 A | 12/2018 |
| KR | 101308859 B1 | 9/2013 |
| WO | 2006101549 A2 | 9/2006 |
| WO | 2007089786 A2 | 8/2007 |
| WO | 2015183493 A1 | 12/2015 |
| WO | 2018174990 A1 | 9/2018 |

OTHER PUBLICATIONS

Chris Hoffman; "How to Disable System Integrity Protection on a Mac (and Why You Shouldn't)"; HowToGeek.com website [full url in ref.]; Jul. 5, 2017 (Year: 2017).
Examination Report dated Apr. 29, 2020 for United Kingdom Patent Application No. GB1715628.2.
Examination Report dated Jun. 14, 2019 for United Kingdom Patent Application No. GB1600738.7.
Combined Examination & Search Report dated Feb. 6, 2018 for United Kingdom Patent Application No. GB1714489.0.
Combined Examination & Search Report dated Aug. 1, 2018 for United Kingdom Patent Application No. GB1802241.8.
Combined Examination & Search Report dated Nov. 16, 2018 for United Kingdom Patent Application No. GB1808380.8.
Combined Examination & Search Report dated Mar. 6, 2019 for United Kingdom Patent Application No. GB1814798.3.
Combined Examination & Search Report dated Dec. 1, 2017 for United Kingdom Patent Application No. GB1708824.6.

* cited by examiner

```
[EXAMPLE RULES]

<?xml version="1.0" encoding="utf-8"?>
<configuration>
    <!-- SID S-1-9-99-123456789-1234567890-1234567890-1001 = Standard -->

<!-- Rules for regedit -->
        <process name="c:\windows\regedit.exe">

<!-- Drop rule for \REGISTRY\USER\SID S-1-9-99-123456789-1234567890-
1234567890-1001\Software\Google\Chrome -->
        <rule type="DROP" sid=" SID S-1-9-99-123456789-1234567890-1234567890-1001">
            <scope type="KEY_ONLY" path="\REGISTRY\USER\SID S-1-9-99-123456789-
1234567890-1234567890-1001\Software\Google\Chrome" />
                      <!-- 0x0009 = Enumerate subkeys | Query Value-->
            <desired_access>0</desired_access>
            <granted_access>0x0009</granted_access>
            <flags>NONE</flags>
        </rule>

<!-- block rule for \REGISTRY\USER\SID S-1-9-99-123456789-1234567890-
1234567890-1001 \Software\Block -->
        <rule type="BLOCK" sid="SID S-1-9-99-123456789-1234567890-1234567890-1001">
            <scope type="KEY_TREE" path="\REGISTRY\USER\SID S-1-9-99-123456789-
1234567890-1234567890-1001\Software\Block" />
            <desired_access>0</desired_access>
            <granted_access>0</granted_access>
            <flags>AUDIT</flags>
        </rule>
    </process>
</configuration>
```

Fig. 7

MANAGING REGISTRY ACCESS ON A COMPUTER DEVICE

RELATED APPLICATIONS

This application is a continuation of U.S. patent application Ser. No. 16/272,266, filed Feb. 11, 2019 and entitled "MANAGING REGISTRY ACCESS ON A COMPUTER DEVICE," which claims the benefit of priority from GB 1802241.8, filed Feb. 12, 2018, each of which are incorporated herein by reference in their entireties.

TECHNICAL FIELD

The present invention relates generally to the field of computers and computer devices. More particularly, the present invention relates to a computer device and to a method of managing registry access on a computer device.

BACKGROUND

It is desirable to implement a least-privilege access security model, where each user is granted only a minimal set of access privileges by way of their standard user account. This model is particularly helpful for reducing the risk of attacks from malicious software (malware).

Most computer devices include a registry, which is a data structure managed by the operating system containing essential information, settings and values relevant to the physical components of the computer device and its installed software and applications. A difficulty arises in that a relatively high privilege level, such as an administrator level, is normally required in order to successfully access the registry. Typically, another user having higher privileges (e.g. an IT support administrator) must be called upon in order to perform registry operations which a standard user is unable to perform by themselves.

Wherever possible, it is desirable to maintain familiar existing user interfaces for accessing the registry. For example, many skilled IT personnel will be familiar with well-known registry editing tools, such as Regedit.exe. One option is to temporarily elevate this tool to a higher privilege level, but the tool then has unfettered access to the registry at that higher privilege level.

The example embodiments have been provided with a view to addressing at least some of the difficulties that are encountered in current computer systems, whether those difficulties have been specifically mentioned above or will otherwise be appreciated from the discussion herein.

SUMMARY

According to the present invention there is provided a computer-implemented method, a computer system and a computer-readable storage medium as set forth in the appended claims. Additional features will be appreciated from the dependent claims, and the description herein.

In one example there is described a method of managing registry access on a computer device. The method includes monitoring a user process on the computer device and, in response, establishing a set of registry access rules relevant to the user process. Also, the method includes evaluating a registry operation requested by the user process and, in response, determining an appropriate action. Such action suitably includes at least one of: blocking the registry operation in relation to a registry of the operating system, and enabling access to a particular key in the registry to perform the requested registry operation. In particular, the method may be performed by a registry filter driver in a kernel mode of an operating system of the computer device.

In one example, there is described a computer device configured to perform any of the methods discussed herein.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

BRIEF DESCRIPTION OF THE DRAWINGS

For a better understanding of the invention, and to show how example embodiments may be carried into effect, reference will now be made to the accompanying drawings in which:

FIG. 7 is an example of registry access rules.

DETAILED DESCRIPTION

The following description reveals example embodiments of a mechanism for managing registry access on a computer device. In at least some examples, the mechanism upholds security of the computer device while enabling the registry to be accessed and modified with minimal additional support or supervision. Many other advantages and improvements will be appreciated from the discussion herein.

The example embodiments will be discussed in detail in relation to computer devices using Windows (RTM) operating systems provided by Microsoft Corporation of Redmond, Wash., USA, and with particular reference to the Windows 10 (RTM) operating system. However, the teachings, principles and techniques as discussed below are also applicable in other specific example embodiments. In particular, the described examples are useful in many computer systems having a security model which employs discretionary access control.

Figure 1:
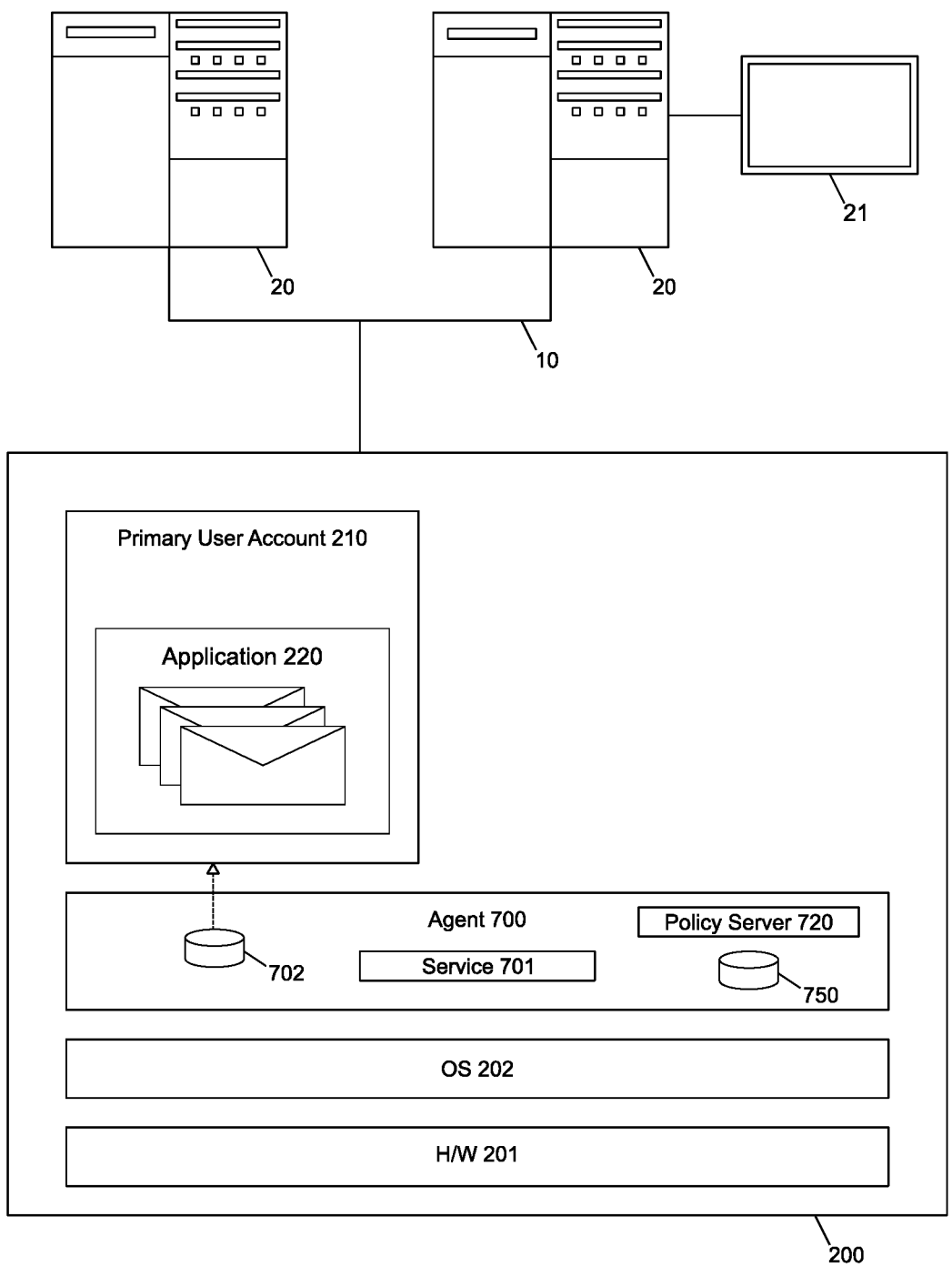
FIG. 1 is a schematic view of an example computer device and network.

FIG. 1 is a schematic overview of an example computer device and network. In this simplified example, an end-user computer device 200 is coupled by a network 10 to a set of servers 20. For example, the network 10 can be a private network, a virtual private network, an intranet, a cloud, or the Internet. In practice, computing environments for large-scale corporations will typically include many thousands of individual end-user computer devices 200 coupled to many tens or many hundreds of servers 20.

Each end-user computer device 200 may take any suitable form factor. As examples, the device 200 might be a desktop computer, a portable computing device, laptop, tablet, smartphone, wearable device, or an emulated virtual device on any appropriate host hardware. The illustrated computer device 200 comprises a layer of hardware (H/W) 201, which suitably includes memory, processors (CPU central processor units), I/O input/output interfaces (e.g. NIC network interface cards, USB universal serial bus interfaces, etc.), storage (e.g. solid state non-volatile storage or hard disk drive), and so on. An operating system 202 runs on the hardware layer 201 to provide a runtime environment for execution of user processes and applications 220. This runtime environment typically provides resources such as installed software, system services, drivers, and files. In this illustration, the applications 220 include an email client which is used to send and receive email messages. Of course, many other types of software applications are available and can be provided according to the needs of the user of each particular device.

In this example, the operating system 202 applies a security model wherein access privileges are based on a user account 210. The operating system 202 may define privilege levels appropriate to different classes of users, or groups of users, and then apply the privileges of the relevant class or group to the particular logged-in user (e.g. ordinary user, super-user, local administrator, system administrator, and so on). The user is authenticated such as by logging-in to the computer device 200, e.g. with a user identity and password, and these user credentials may be validated locally or via a remote service such as a domain controller. The current user, via their previously prepared security account, thus acts as a security principal in the security model. The operating system 202 of the computer device 200 then grants appropriate privileges to the processes and applications 220 which execute in the security context of that primary user account 210.

In this example, the computer device 200 further comprises an agent 700. The agent 700 may comprise one or more software and/or hardware modules, such as executables, dynamic libraries, plug-ins, add-ins, add-ons or extensions. In the context of Windows operating systems, the agent 700 may comprise a Windows service 701 which acts as a core module or kernel component. In a macOS environment, the agent 700 may comprise a daemon, which runs as a background process on the computer device. The agent 700 may further comprise one or more injected libraries 702 (i.e. a dynamic linked library DLL) which may be injected by a driver into the context of the user account 210. Thus, the agent 700 is configured to operate in close cooperation with the operating system 202 and with the client applications 220.

In this example, the agent 700 supports core capabilities for security of the computer device. In particular, the agent 700 suitably implements at least a privilege management function and an application control function. The agent 700 acts as a secure gatekeeper to control activity on the computer device 200 in addition to, and in cooperation with, the existing security mechanisms of the operating system 202.

When considering privilege management, it is desirable to implement a least-privilege access security model, whereby each user is granted only a minimal set of access privileges. Many application programs however require a relatively high privilege level, such as a local administrator level, in order to be installed, modified or removed, including permitting access to the registry. Hence, in practice, there is a widespread tendency to grant additional privilege rights, such as the local administrator level, or a system administrator level, to all members of a relevant user group, and thus allow access to almost all of the resources of the computer device. This level of access may be greater than is desirable or appropriate from a security viewpoint. For example, there is a possibility of accidental tampering with the computer device, e.g. by accidently modifying the registry, leading to errors or corruption within the computer device. Further, an infection or malware may access the computer device with the deliberate intention of subverting security or causing damage, such as by modifying a normal and otherwise harmless application, e.g. to hide a key log to obtain credit card numbers or bank details.

In one example, the primary user account 210 has a relatively low privilege level. The agent 700 then selectively enables access to higher privilege levels, e.g. a local administrator level, when needed to perform certain tasks. Thus the agent 700 provides the privilege level to perform a specific task, but does not provide a general high level privilege to the user account. Conversely, the agent 700 in some examples is also able to downgrade the privilege level, so that certain tasks are carried out at a privilege level lower than that of the current user account 210.

For application control, the agent 700 is arranged to ensure that only authorised applications 220 may be installed on the computer device 200. For example, the agent 700 may comprise a list of approved and/or restricted applications. There may be a sophisticated set of rules which define the conditions under which each application may be installed, modified, or removed, in relation to the intended host computer device 200 and the relevant user account 210. Thus, in this example, the email client application 220 on the computer device 200 will only be installed, removed and/or modified (e.g. updated to a more recent version) if permitted by the rules as implemented by the agent 700.

In one example, the agent 700 is coupled to a policy file 750. The policy file 750 stores a set of policies which define responses of the agent 700 to requested actions or tasks. A policy server 720 may be provided to make policy decisions based on the policy file 750. Suitably, the policy server 720 is provided as a service locally on the computer device 200 which links to other components of the agent 700. That is, the policy server 720 may reside as a component within the agent 700, or can be implemented as a separate service that is communicably linked to the agent 700. The policy server 720 may operate by receiving a policy request message, concerning a requested action and related meta-information, and returning a policy result based thereon. In one example, the agent 700 is configured to capture a set of identities, and may then provide these identities as part of the policy request. Such identities may include, for example, a user identity (UID) of the relevant user account 210, a group identity (GID) of a group to which that user account 210 belongs, a process identity (PID) of a current process which has initiated the action or task in question, and/or a process identity of any parent process (PPID). Suitably, the policy server 720 determines an outcome for the request based on the provided set of identities relevant to the current policy request.

In one example, the policy file 750 is a structured file, such as an extensible mark-up language XML file. The policy file 750 is suitably held locally on the host device 200, ideally in a secure system location which is accessible to the agent 700 and/or the policy server 720 as appropriate, but which is not accessible by the user account 210. Updates to the policy file 750 may be generated elsewhere on the network 10, such as by using a management console 21 on one of the servers 20, and then pushed, or pulled, to each instance of the agent 700 on each device 200. The policy file 750 is readily updated and maintained, ensuring consistency for all devices across the network. In this way, the agent 700 is robust and manageable for a large-scale organisation with many thousands of individual computer devices 200. Also, the agent 700 is able to leverage rules which have been developed in relation to application control, such as defining user groups or user roles and related application permissions, and now extend those same rules also to privilege management, and vice versa.

In some examples, the agent 700 is configured to perform custom messaging. In particular, agent 700, whether acting directly or via a cooperating proxy or plugin, may present a message dialog to the user. This message dialog may be presented in a terminal from which a current action of interest was invoked by or on behalf of the user. Thus, the custom messaging may be presented on a display of the computer device 200 for interaction with the user. Input from the user may be returned to the agent 700 for evaluation. Hence, the agent 700 is able to interact with the user with a rich set of customizable messages.

In one example, the custom messaging may include at least one of a confirmation, a challenge-response, and a reason. In more detail, the confirmation may present a dialog which receives a binary yes/no type response, allowing the user to confirm that they do indeed wish to proceed and providing an opportunity to double-check the intended action. The custom messaging conveniently allows specific text, e.g. as set by the policy file 750, to be included in the dialog, such as reminding the user that their request will be logged and audited. As another option, the custom messaging may provide specific block messages, explaining to the user why their request has been blocked, thus enabling improved interaction with the user.

In one example, the custom messaging may require additional authentication to be presented by the user in order to proceed with the requested action. As an example, the additional authentication may require the user to again enter their username and password credentials, or may involve one or more of the many other forms of authentication (e.g. a biometric fingerprint or retinal scan) as will be appreciated by those skilled in the art. The challenge-response also allows alternate forms of authentication to be employed, such as a two-factor authentication. In one example, the challenge-response requires entry of a validation code, which might be provided such as from a second device or an IT helpdesk.

In one example, the reason allows the user to provide feedback concerning the motivation for their request, e.g. by selecting amongst menu choices or entering free text. Logging the reasons from a large set of users allows the system to be administered more efficiently in future, such as by setting additional rules in the policy file 750 to meet the evolving needs of a large user population.

Notably, custom messaging allows the agent 700 to provide a rich and informative set of interactions with the users. Each of these individual custom messaging actions may be defined in the policy file 750. The custom messaging may eventually result in a decision to allow or block the requested action. An appropriate allow or block operation is then carried out as required.

In this example, the agent 700 may further perform auditing in relation at least certain requests. The auditing may include recording the customised messaging, if any, and may include recording an outcome of the request. Audit reports may be extracted or uploaded from each end-user device 200 such as to the management console 21 on the servers 20 at any suitable time or frequency or based on any suitable event. Each of these auditing functions may be defined in the policy 750.

In some examples, the agent 700 is configured to perform passive handing of a request. In this case, the request is presented to the originally intended recipient, typically within the operating system 202, and any responses may be returned transparently. In one example, passive handling is defined by the policy file 750. The agent 700 can meanwhile audit the requests which were handled passively, again consistent with the policy file 750. Notably, this passive handling function allows the action to proceed while the requesting user process or application is unaware of the agent 700 as intermediary. Advantageously, default behaviour of system is maintained for those actions that the agent 700 determines should have passive handling. Also, there is now a fail-safe option, in that the system will maintain an expected behaviour for actions that are passively handled. This passive handling is useful particularly in the event that a particular user or request is not specified in the policy file 750, because default behaviour is still enacted. Hence, the system can now quickly and safely supersede the original behaviour for specific situations, allowing rapid responses and network-wide consistency when needed, while still enabling existing legacy functionality and behaviour to continue in place for other actions, users and/or devices, as appropriate.

Registry Control

Figure 2:
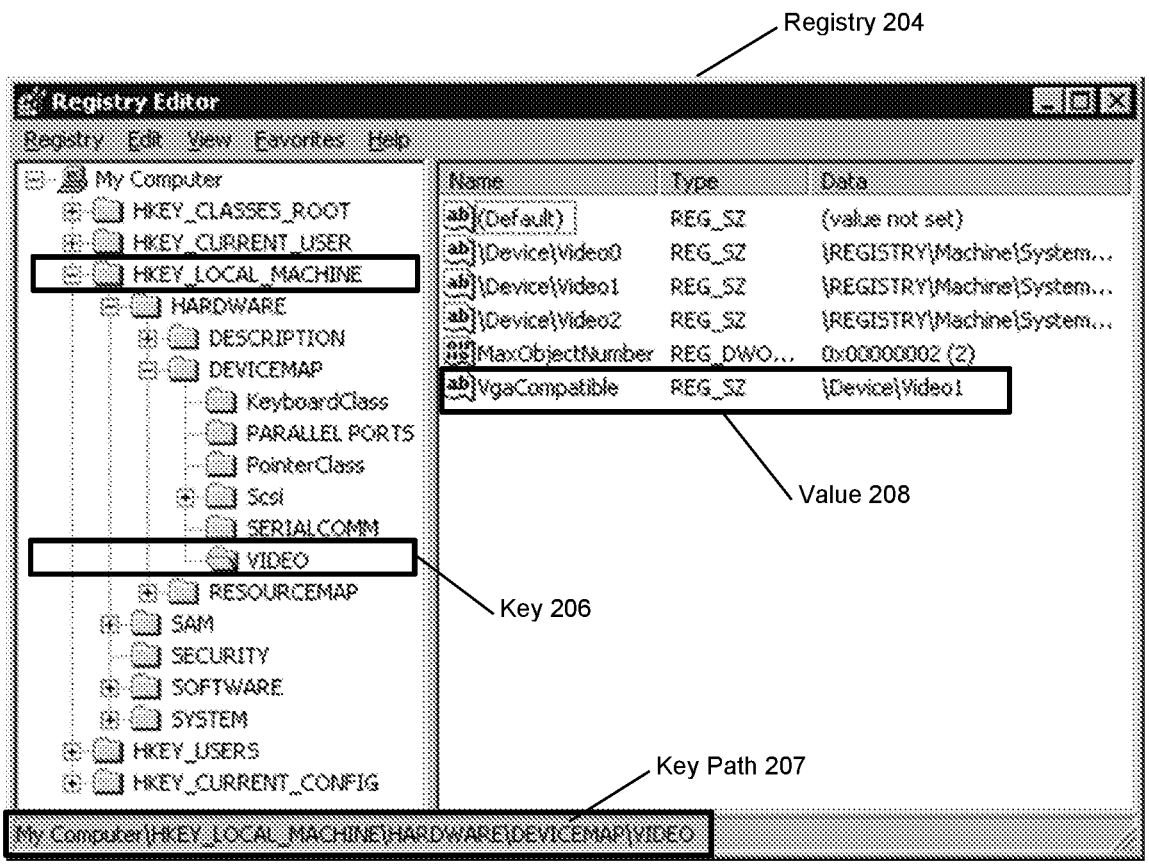
FIG. 2 is an example screenshot of a system registry using a registry editing tool.

FIG. 2 shows the example computer device 200 in more detail in relation to managing registry access. By way of introduction, FIG. 2 is an example screenshot showing a registry 204 as displayed by a registry editing tool. As will be familiar to those skilled in the art, the registry 204 is a hierarchical data structure which is maintained by the operating system 202. The registry 204 comprises configuration data (low-level settings) for the operating system 202 relevant to the hardware of the computer device 200 and the relevant user accounts 210 operating thereon. The registry 204 also contains configuration for the various applications 220 which are installed on the computer device 200. Errors in the registry 204, whether introduced inadvertently or maliciously, are often serious. These errors can cause the system to function incorrectly, or crash completely, and to recover may require a complete reinstallation of the operating system 202.

The registry 204 contains a plurality of keys 206 and values 208. In Windows systems, the registry has a defined set of root keys at the root level of the hierarchy, of which two well-known examples are HKEY_LOCAL_MACHINE (often abbreviated to 'HKLM') which stores settings specific to the computer device 200, and HKEY_CURRENT_USER ('HKCU') which stores settings relevant to the primary user account 210 of the logged-in user. The registry values 208 each contain a name and data pair within a relevant key 206. The registry values 208 are accessed and referenced separately from the registry keys 206, and each key may contain multiple named values. The data of each value 208 can have variable length and encoding, and may be associated with defined standard value types that define how to parse the data. The registry contains several other root keys, each with many individual subkeys, similar in concept to a set of folders in a file system, giving a unique key path 207 for each key 206. Registry permissions typically include the right to query the key, set a value, create subkeys, or delete the key, amongst others. Each key 206 has an associated security descriptor (SD), as for other securable objects. The operating system 202 controls access to each registry key 206 by access control lists (ACLs), user privileges, and security tokens acquired by the applications 220. System security policies may be predefined by the operating system 202, or may be configured by local system administrators or by domain administrators, e.g. via group policy, which further restrict visibility of certain keys and access thereto. Thus, particular users, programs, services or remote systems may only see some parts of the hierarchy, or see distinct hierarchies, from the same root keys. Further background information concerning the registry is widely available and need not be discussed in detail here.

The registry 204 may be accessed in a number of different ways. Conveniently, the operating system 202 provides a set of API functions which allow the registry keys 206 and values 208 to be queried and manipulated programmatically by user-mode applications. For example, the registry 204 is frequently accessed by installer programs during installation, modification or removal of installed applications 220. The registry 204 may be accessed by various programs having built-in library functions which use the underlying APIs, or scripts which enable registry editing. The registry 204 may also be accessed manually via command line editing, via a registry editing tool as illustrated in FIG. 2 which provides a convenient graphical user interface, or via a configuration management framework such as Windows PowerShell, amongst other options. Also, the registry 204 may be accessed remotely from another computer, e.g. by the RegConnectRegistry function. Hence, there is a challenge to manage access to the registry 204, and particularly to improve upon the security functions already provided natively by the operating system 202.

Figure 3:
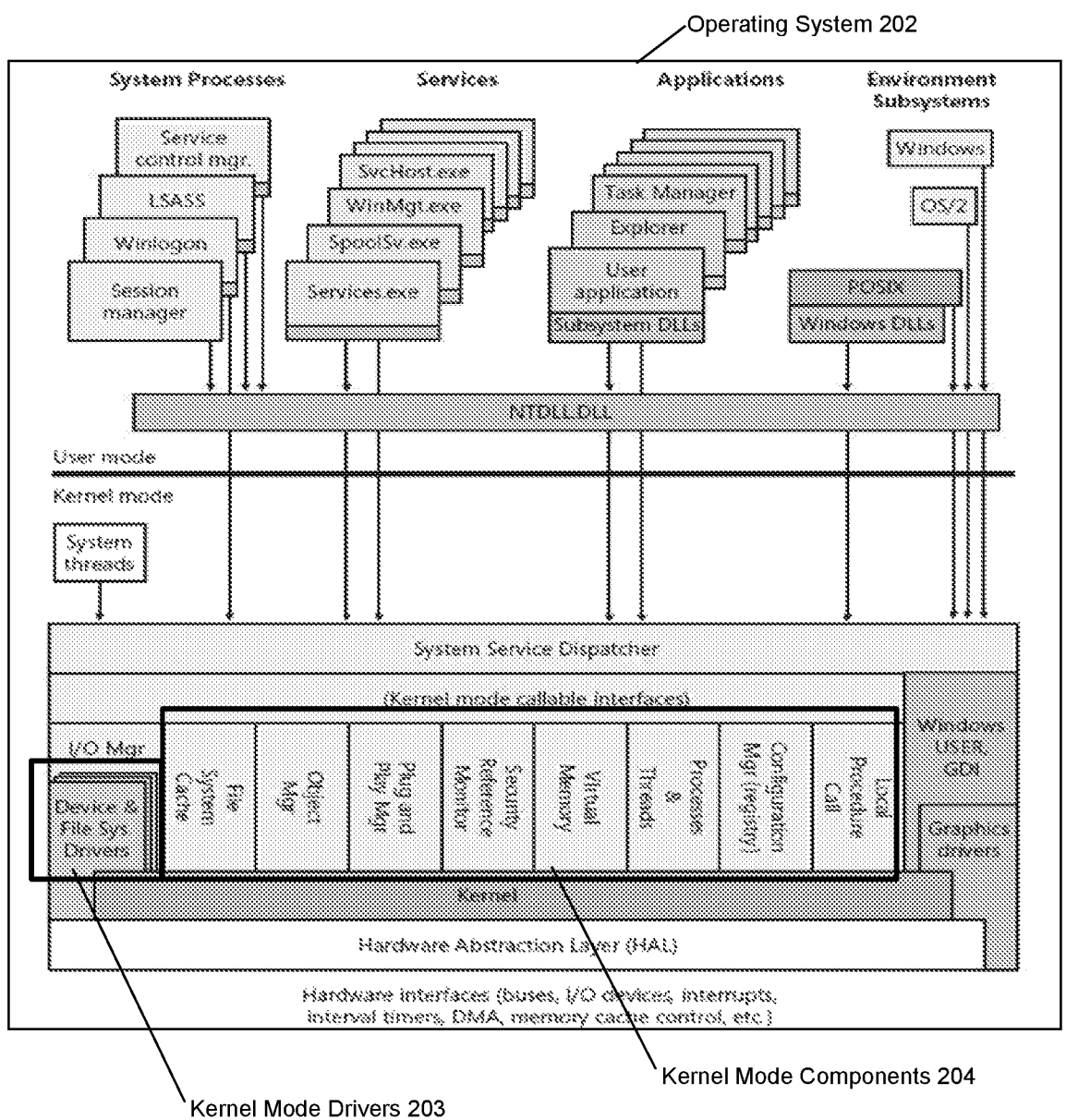
FIG. 3 is a schematic view of an example operating system in the computer device.

FIG. 3 shows the example computer device 200 in more detail. In particular, FIG. 3 illustrates example components within the operating system 202 of a typical Windows system. The operating system 202 is shown logically divided into a user mode and a kernel mode, and as in this example typically has components in each of those modes. The kernel mode components include kernel mode drivers 203, here illustrated by the device drivers and file system drivers. These drivers 203 call routines that are exported by the various kernel components 204 (and not all of those components are illustrated, as will be appreciated by those skilled in the art). These kernel mode drivers 203 are typically supplied by original equipment manufacturers (OEMs) and independent hardware vendors (IHVs) to augment the native components of the operating system 202 for particular hardware devices (e.g. adding additional security checks for a particular keyboard). The drivers 203 may be chained together, leading from highest-level drivers through intermediate level drivers to lowest-level drivers, optionally with zero, one or more drivers at each level. The intermediate drivers may include class drivers for a particular class of device, function drivers as the main driver, e.g. as the operational interface to control a particular peripheral device on an I/O bus, and filter drivers inserted above or below a function driver. Again, further background in relation to kernel-mode filter drivers is readily available for the skilled person.

Figure 4:
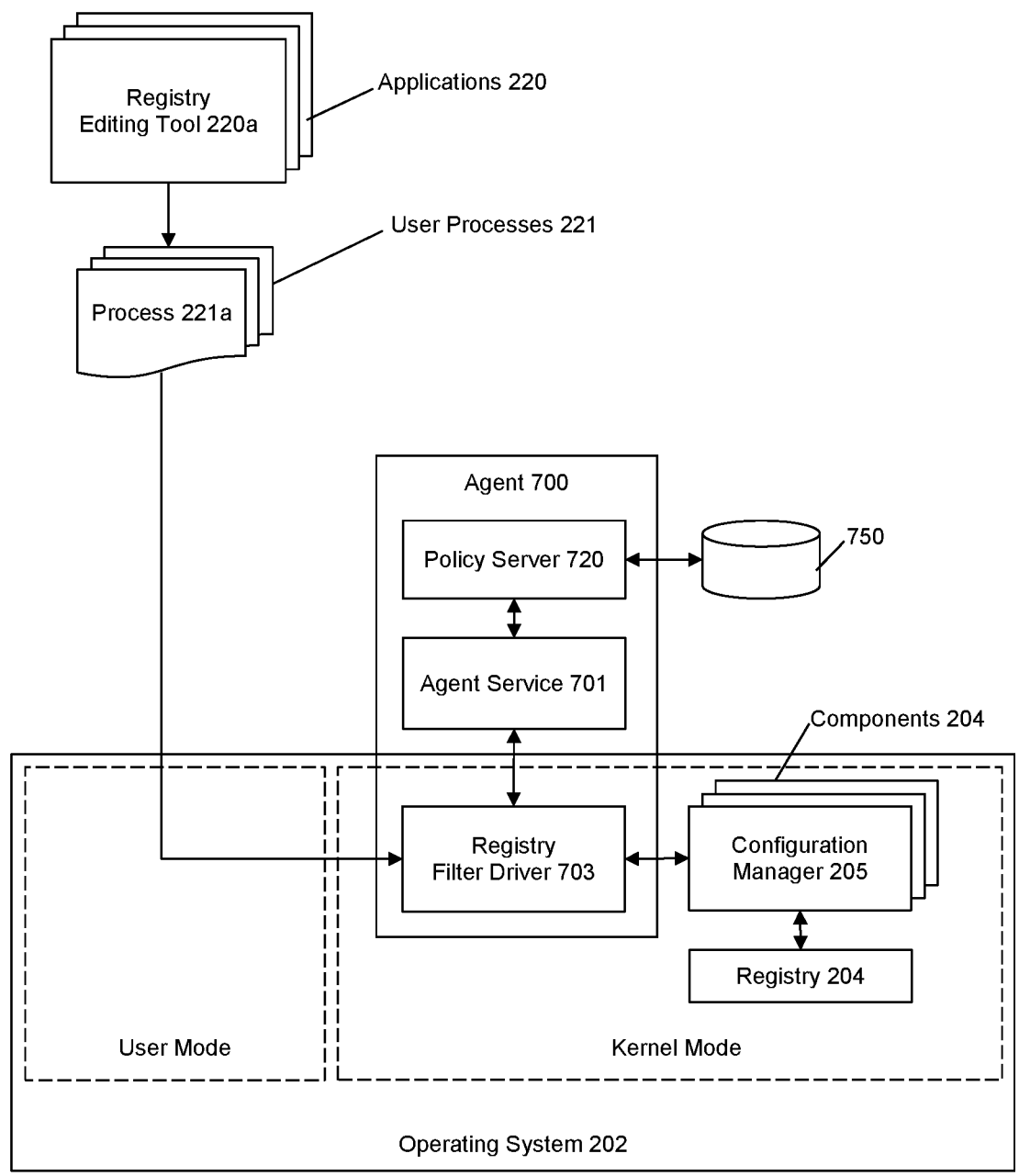
FIG. 4 is a schematic view showing the example computer device in more detail.

FIG. 4 shows the computer device 200 in further detail. In this example, the agent 700 includes a registry filter driver 703. The registry filter driver 703 suitably operates in cooperation with the service 701 which, as discussed above, is a core component of the agent 700. The registry filter driver 703 is a driver that operates in the kernel mode of the operating system 202, with corresponding greater privileges than the user mode. In particular, the registry filter driver 703 has access to kernel mode native APIs of the operating system 202, rather than the user-mode Windows API for applications. In this example, the registry filter driver 703 is configured as a filter driver. A filter driver is a driver which modifies behaviour of the system. In particular, the registry filter driver 703 connects to a configuration manager 205 which is suitably provided amongst the kernel mode components 204 of the operating system 202. In this example, the configuration manager 205 is a native component of the operating system that controls access to the registry 204.

In this example, the registry filter driver 703 is configured to observe a plurality of user-mode processes 221 running on the computer device 200 and to manage each request made by any of those processes 221 to access the registry 204. The registry filter driver 703, being above the configuration manager 205, may apply rules which alter the outcome of the registry access requests made by those user processes 221.

By way of illustration, FIG. 4 shows a registry editing tool 220a (e.g. RegEdit.exe) operating in the user account 210 of the logged-in user. The registry editing tool 220a receives user inputs, e.g. via a GUI, which are intended to query or to modify the keys 206 in the registry 204 (or equally a value 208 within a key 206). As illustrated, a particular user process 221a is executed for the registry editing tool 220a. Of course many other specific examples for accessing the registry 204 will be appreciated from the discussion herein.

Figure 5:
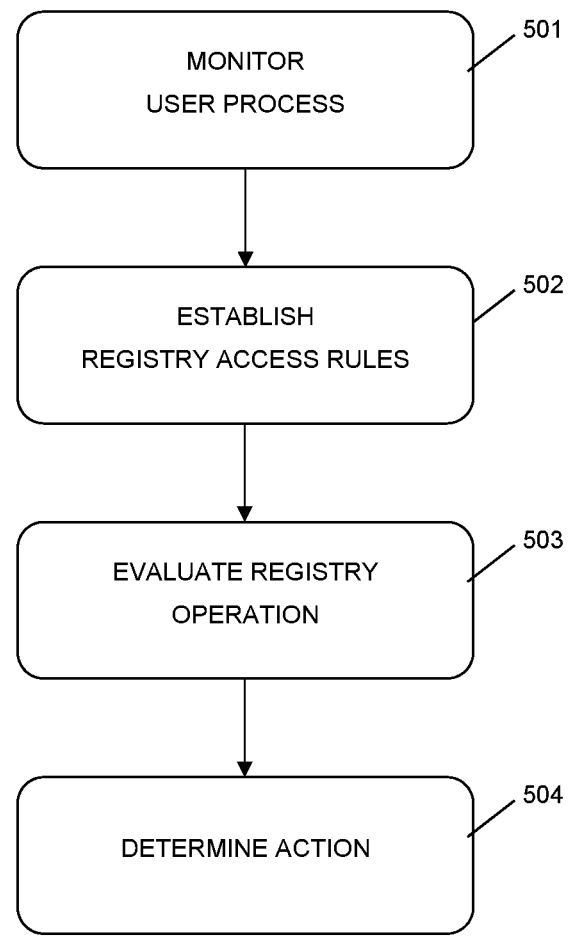
FIG. 5 is a flowchart showing an example method of managing registry access.

FIG. 5 is a flowchart illustrating an example method of managing registry access, which in this case is appropriate to the computer device 200 described above.

Step 501 comprises monitoring a user process on the computer device. Step 502, in response, comprises establishing a set of registry access rules relevant to the user process. Conveniently, the registry filter driver 703 in a kernel mode of the operating system 202 monitors for creation of each user process and the registry access rules appropriate to that process are established in response to creation of the process. In other examples the rules may be established at any other convenient time.

Step 503 comprises evaluating a registry operation requested by the user process, which might occur at any time during the lifetime of that user process. The evaluation may be performed by the registry filter driver 703 using the set of registry access rules which have been established specifically for that process. As at step 504, an action is determined in response to the evaluation, suitably including at least one of: blocking the intended registry operation, and enabling access to a particular key in the registry to perform the requested registry operation. Other action types are also possible, as explained in more detail below.

Figure 6:
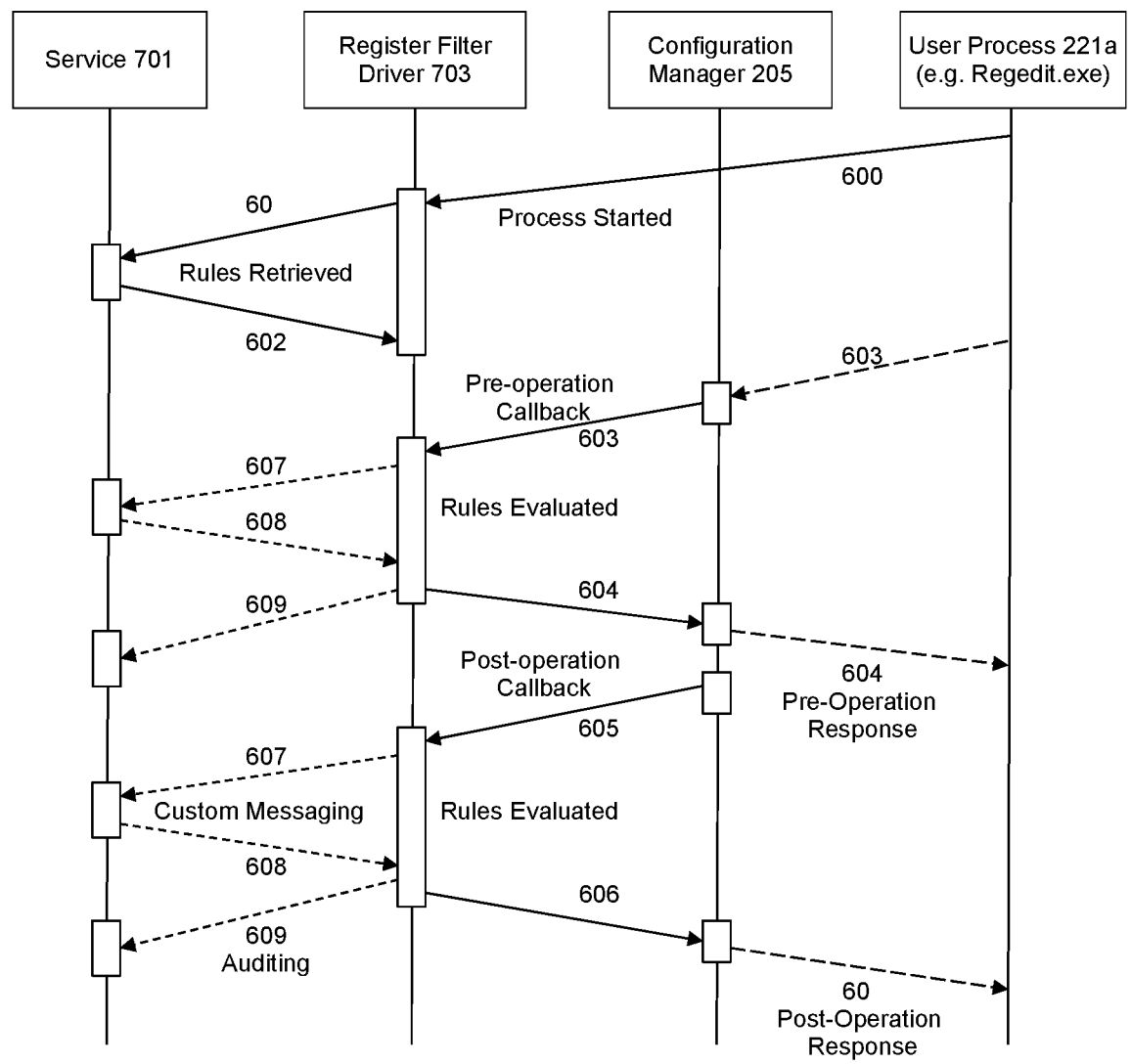
FIG. 6 is a tramline diagram showing an example method in more detail.

FIG. 6 is a tramline diagram illustrating in more detail an example workflow of the computer device 200 when managing registry access.

Firstly, the registry filter driver 703 is configured to gain visibility of each executing user process 221. In this example, a process 221a is created by the operating system 202 responsive to launching the registry editing tool 220a, as at step 600. At step 601, the registry filter driver 703 monitors for creation of each user process 221. The registry filter driver 703 may use process creation notifications to establish that the user process 221a has started, such as the PsSetCreateProcessNotifyRoutine callback routine.

In this example, the registry filter driver 703 is configured to establish a set of registry access rules for each process 221. Suitably, in response to creation of the process 221a, the registry filter driver 703 is configured to message the service 701. In reply, the registry filter driver 703 receives, as at step 602, a set of registry access rules for that process 221a. Messaging between the registry filter driver 703 and the service 701 may be performed by any convenient form of inter-process communication. Conveniently, the service 701 gathers meta-data in relation to the new process 221a which is used to query the policy file 750 via the policy service 720. The registry access rules may be retrieved, for example, based on UID, GUID, PID and/or PPID, amongst others, as already discussed above. Thus, a tailored set of registry access rules is established appropriate to the particular user process 221a. Any attempt subsequently by the process 221a to access the registry 204 will be subject to those access control rules, which here are imposed by the registry filter driver 703.

Notably, establishing the relevant set of registry access rules upon process creation may significantly reduce workload in the system. In one example, registry control may be combined together with application control. In this case, the agent 700 may firstly determine whether or not the created process 221a should be allowed to run. That is, the agent 700 may firstly establish that the created user process relates to a permitted application, e.g. that the current user is permitted to run RegEdit.exe as a registry editing tool. Conveniently, the same meta-information regarding the process 221a may then also be used to determine appropriate registry access rules. In some examples, establishing the registry access rules at process start-up reduces subsequent workload during the lifetime of that process, such as by avoiding repeated inter-process messaging or rule look-ups.

In many cases, the returned rules may indicate that additional registry control is not required for this particular process. For example, the returned set of rules may be empty (null). In which case, no further action is taken by the registry filter driver 703 and the process in question proceeds to access the registry 204 under the default security control of the operating system 202. In practice, most user processes have little or no expected need to access the registry in normal operation. Hence, these processes may retain their default registry access as set by the operating system, and a one-time establishment of the registry access rules reduces subsequent workload in the system.

As at step 603, the registry filter driver 703 is configured to receive a notification when the process 221a which is of particular interest (i.e. RegEdit.exe) performs a registry operation that is intended to access the registry 204. In one example, the registry filter driver 703 registers a set of callbacks with the configuration manager 205, whereby the process 221a attempting any of the relevant registry operations provokes a respective callback to the registry filter driver 703. In response to this callback, the registry filter driver 703 may monitor, block or modify the requested registry operation.

The intended registry operation is evaluated, suitably by the registry filter driver 703. This evaluation may include a gate decision in consultation with the service 701 as at steps 607 & 608, e.g. to perform custom messaging with a respective outcome or response. Also, the registry filter driver 703 may contribute to auditing of the registry operation, as at step 609. An outcome is eventually determined (e.g. to block the registry operation, allow the registry operation, or perform the registry operation in modified form) and a result returned as at step 604 or step 606.

In Windows systems, the registry filter driver 703 can call CmRegisterCallbackEx to register a RegistryCallback routine, which is called every time a user process (thread) performs an operation on the registry. The callbacks may include pre operation callbacks and/or post-operation callbacks. A pre operation callback (pre-notification) provides a notification to the registry filter driver 703 before the configuration manager 205 processes the intended registry operation, as at step 603. A post-operation callback (post notification) notifies the registry filter driver 703 immediately after the operation completes, but before the configuration manager 205 itself returns to the caller process 221a, as at step 605. Thus, the operating system 202 provides a set of useful callback notifications, but a difficulty still remains in taking effective action for a wide variety of practical scenarios. In the example system, the registry filter driver 703 may now apply the appropriate access control rules for this process 221a, as established earlier.

In these examples, evaluating the registry access rules with the registry filter driver 703 has a notable performance benefit. Firstly, the actions to be taken in response to an identified rule are inherently kernel-mode. For example, those actions will bypass the standard security, or return their results to the registry filter callbacks. Secondly, rule evaluation in the kernel does not incur the overhead of kernel-mode to user-mode communication. In other examples, the rule evaluation may take place, wholly or partially, within a user-mode component. The user-mode component may be implemented in a separate stand-alone component or, for example, may be provided within the agent service 701. This user-mode component may operate to evaluate appropriate registry access rules responsive to the intended registry operation as communicated by the registry filter driver 703. The evaluation may be performed in conjunction with the policy server 720. In one example, the registry filter driver 703 may message the user-mode component to perform rule matching, and may conveniently receive in return a set of one or more actions to be performed.

The registry access rules may have defined scopes. A rule may apply only to a specified key, or may apply to a key tree including all children of the specified key. The scope may also define that the rule applies only to specific values.

The registry access rules may be defined as several types, suitably including a block type, an elevate type, a drop type and an add type. When rules of a certain type are present, the registry filter driver 703 may then register an appropriate group of registry callbacks, as illustrated by Table 1 below. Not all types need be present within a particular set of rules, and other types might be included in other embodiments.

TABLE 1

Registry Callbacks by Rule Type

| Callback | Elevate Rule Type | Block Rule Type | Drop Rule Type | Add Rule Type |
| --- | --- | --- | --- | --- |
| PostCreateKeyEx | X | | | |
| PostOpenKeyEx | X | | | |
| PostRenameKey | X | | | |
| PreCreateEx | | X | | |
| PreOpenKeyEx | | X | X | X |
| PreQueryKeySecurity | | | X | X |

In one example, a block type rule is applied prior to the access being attempted, so that the requested registry operation is prevented prior to reaching the registry 204. In particular, the block rule type may block access by this user process to a registry key which would ordinarily have been permitted, i.e. according to the regular access control list (ACL) of that key. In the illustrated example, the intended registry operation is prevented from proceeding though configuration manager 205. The registry filter driver 703 may then initiate a pre operation response to the initiating user process 221a, as at step 604, e.g. notifying the calling process that the requested registry operation has been denied. Conveniently, auditing or custom messaging may be employed at this point.

In another example, a drop rule is applied to remove a user's rights from a particular key, to which they would ordinarily have had access, e.g. to prevent a write (set) operation, a create operation or a delete operation, whilst still permitting a query operation. Likewise, an add rule may be used to add specific rights for a particular key which ordinarily would not be present. In one example, an allow type rule may be used to indicate that the requested registry operation should proceed without modification. In another example, an allow action may be determined by default in the absence of any specific rule to the contrary.

In one example, the registry filter driver 703 is configured to temporarily modify a discretionary access control list (DACL) for a particular key in the registry 204. In particular, the security descriptor (SD) structure is modified, by including an appropriate access control entry (ACE) within the DACL. In one example, the SD structure for the key may be obtained such as by using the registry callback RegNtPreQueryKeySecurity, or is obtained within the callback by calling ZwQuerySecurityObject. The SD comprises an owner SID, a group SID, the system access control list (ACL) and the DACL. Initially, the SD from the key will be in self-referential format using relative offsets rather than pointers, allowing the SD structure to be copied as a contiguous block of memory while maintaining integrity. Suitably, the registry filter driver 703 converts the SD to absolute format. An appropriate access control entry (ACE) may be added, particularly ALLOW_ACCESS or DENY_ACCESS. In this case, the registry filter driver 703 then converts the SD back to self-relative format and, assuming that the size constraints are met, copies the modified SD back into the user buffer returned to the caller process 221a. The callback may then return an appropriate status to the configuration manager 205, such as returning STATUS_CALLBACK_BYPASS. The modified SD may then permit (or deny) access to the relevant key upon presentation of the SID of the logged-in user, which previously would not have been the outcome. In one example, when the configuration manager 205 receives STATUS_CALLBACK_BYPASS from the driver 703, STATUS_SUCCESS is returned to the calling process 221a. In this example, the configuration manager 205 does not further process the operation, i.e. any post-notification callback for this registry operation does not occur. The example embodiments may also, or alternatively, use impersonation, as described below.

In one example, an elevate rule may be applied to allow user access to a registry key which the key's ACL would normally have prevented. In particular, the elevate rule may indicate the use of an impersonation token. In this case, the registry filter driver 703 may initially allow the registry operation to proceed through the configuration manager 205, thereby minimising workload should the operation actually succeed. A post-operation callback informs the registry filter driver 703 of the outcome, as at step 605. If the operation has failed, according to the ordinary security process, then the registry filter driver 703 may now intervene to help successfully complete the intended operation. In particular, the operation is reattempted while impersonating a token provided to the registry filter driver 703 by the service 701. A post-operation response is provided as at step 606. Suitably, the step 602 further includes sending an impersonation token to the registry filter driver 703, which conveniently occurs alongside establishing the set of registry access rules. The registry filter driver 703 then performs impersonation, such as by using routines in the operating system 202 including PsImpersonateClient In this way, a handle may be returned to the requesting client (e.g. user process 221a) giving access to a relevant object, in this case a key of the registry 204. Also, for example, the owner of a key created by a particular rule is assigned appropriately.

FIG. 7 is an example to illustrate the registry access rules. In this example, the registry access rules are configured in an XML format. The rules are conveniently added to the policy file 750, as noted above, so as to be available to the service 701 on start-up of the agent 700.

As illustrated, each rule may be defined on a per-process basis, with each rule conveniently containing a security identity (SID) of a user to which that rule applies. When a process starts from that user account 210, any rules which are appropriate to that process are established, here conveniently serialized and sent to the registry filter driver 703, where they are subsequently enforced. Each rule may be associated with a particular process (e.g. the process name 'Regedit.exe' identified by its path). Each rule may have a type (e.g. a block rule type, or a drop rule type, as illustrated). Each rule may have a scope in terms of the particular key of interest, and extent in terms of the whole tree, key only or named value (here the drop rule relates to the keys for 'Google (RTM) Chrome (RTM)' as an installed application). The access type may then identify a particular access which is to be blocked or allowed, added or dropped, for that rule. One or more flags may be provided to denote additional features such as auditing and custom messaging.

Remote Registry

Figure 8:
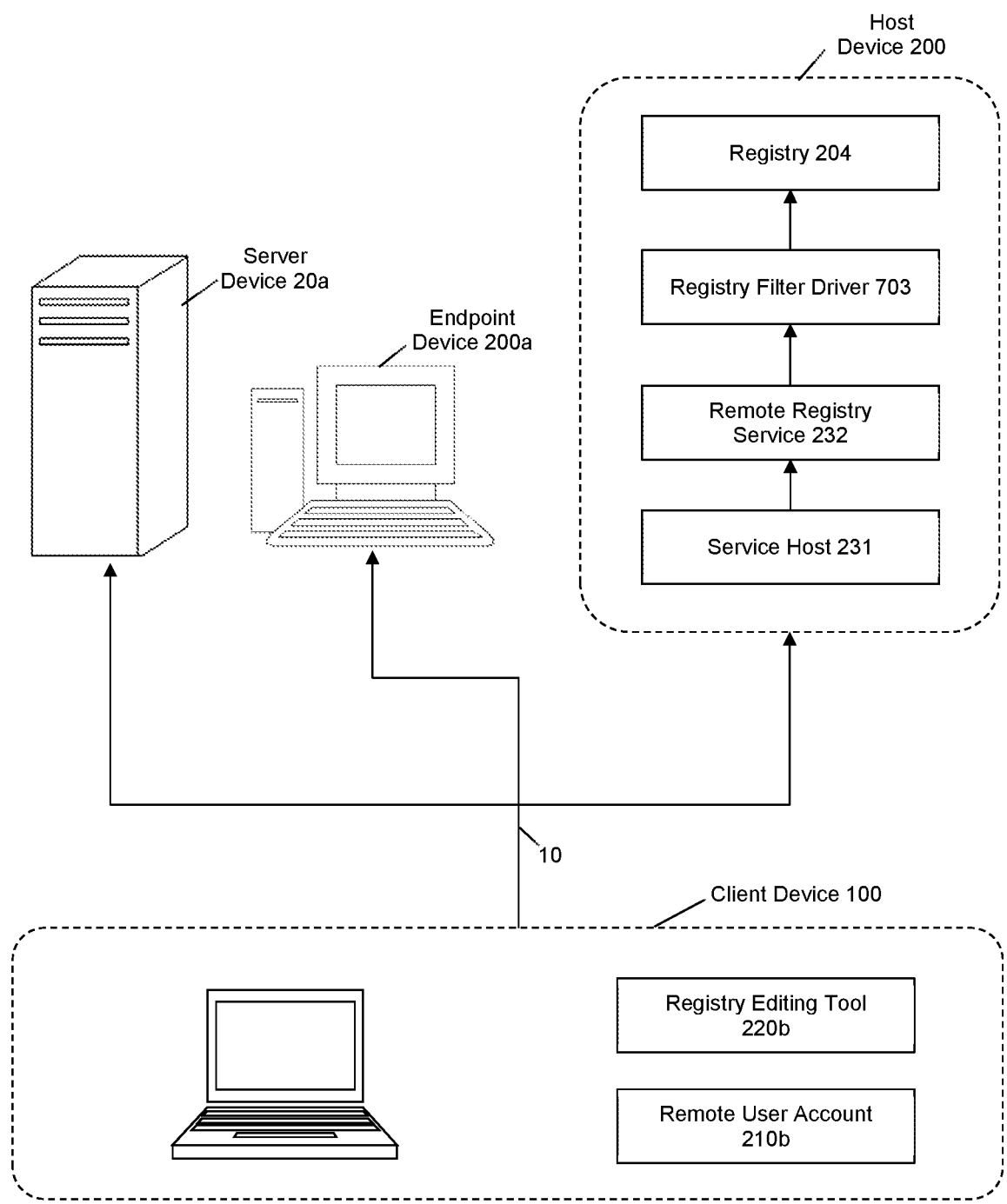
FIG. 8 is a schematic view of example computer devices with remote registry access.

FIG. 8 is a schematic view of a computer network wherein the described mechanism is extended to also handle remote registry access.

Generally, it is desired to control access to the registry 204 of one computer device 200 remotely from another computer device 100 on the network 10. In particular, in a Windows system, the Remote Registry service is convenient to allow an IT administrator using their client computer 100 to access the registry of a host device 200, such as a user's endpoint computer 200a. For example, the IT administrator may need to examine keys and values or make manual repairs and modifications, such as correcting registry settings for a particular application (e.g. Microsoft Word). As another example, the IT administrator using the computer 100 is tasked with performing maintenance operations on one of the servers 20a, including inspecting or changing registry settings. In the example embodiments it is desirable to manage registry access remotely using the same well-known registry access tools 220b (e.g. RegEdit.exe), although other options are available.

In this example, a remote registry service 232 (e.g. Regsvc.exe) is hosted by a service host process 231 (e.g. svchost.exe) on the host device 200. Conveniently, this remote registry service 232 uses the remote procedure call (RPC) protocol to communicate over the network 10. In one example, the host computer 200 is configured to have a single instance of the service host process 231, making for easier identification of the remote registry service 232 in that one service host process 231. The remote machine (client device 100) may use the registry editing tool 220b, and opens a path to the host computer device 200, such as by the menu command 'File>Connect Network Registry'. The remote user is authenticated (i.e. by their user account 210b) and their credentials (e.g. their security identifier SID) cached at the client device 100 during that session. The remote registry service 232 on the host computer device 200 will impersonate as this authenticated user 210b when performing any registry operations. As discussed above, the registry filter driver 703 may now utilise the authenticated user 210b to identify an appropriate set of registry access rules, and then evaluate the requested registry operations in relation to that remote user account 210b. In particular, access may be actioned by modifying the relevant DACL to add an appropriate ACE to the relevant registry key of interest.

The registry access rules for the remote registry service 232 are suitably established in response to start-up of an instance of the service host process 231 (svchost.exe). Conveniently, appropriate meta-information such as the process identity PID for the remote registry service 232 on the host device 200 can be obtained using APIs to a service control manager (SCM) as one of the user-mode components of the operating system 202 illustrated in FIG. 3. For completeness, example embodiments also perform a check for the remote registry service 232 upon startup of the agent service 701, just in case the agent 700 has started after the remote registry service 232, e.g. during a boot-up sequence of the host device 200.

In summary, the mechanism described herein provides for management of registry access. In the illustrative examples, access in the registry to specific keys can be blocked which would otherwise have been accessible under the ordinary security permissions of the logged-in user as applied by the operating system. Security and stability of the computer device are therefore increased. Conversely, access may be enabled to specific keys which would otherwise have been denied, again with fine granular control and without enabling access to any other part of the registry. In some examples, registry access is controlled relevant to specific keys, and access control is suitably evaluated on a per-process basis. Access may be gated and may be combined with other control options (e.g. custom messaging). Registry access may also be audited, again at definable levels of granularity including per-process, per-key or per key-tree. As in the illustrated examples, specific applications may be targeted by relevant sets of access control rules which are tailored to the needs and demands of that application for relevant user groups.

The present mechanism has many benefits across a diverse population of users. Ordinary end users are now able to modify the registry when appropriate using standard tools (e.g. RegEdit.exe), and may do so without unnecessary delay. IT administrators are now better able to support users to update registry settings for a particular application or part of the registry without causing unwanted side effects, and all without requiring full administrator privileges. Meanwhile, as in the illustrated examples, malicious software is unable to reach any part of the registry. Even legitimate users are prevented from tampering or accidentally changing any part of the registry, unless specifically granted permission to access specific keys.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processor circuits. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the invention, as defined in the appended claims.

What is claimed is:

1. A method, comprising:
    monitoring, via a registry filter driver executed on at least one computing device, a user process on the at least one computer device;
    determining, via the registry filter driver, a set of registry access rules relevant to the user process by querying a policy service for a policy file associated with the user process based on meta-data in relation to the user process, wherein the policy file comprises the set of registry access rules;
    performing, by the registry filter driver, an evaluation of a registry operation requested by the user process based on the set of registry access rules; and
    determining an action based on the evaluation, wherein the action comprises at least one of:
        blocking the registry operation in relation to a particular key in a registry of an operating system, and
        enabling access to a particular key in the registry of the operating system to perform the registry operation requested by the user process.

2. The method of claim 1, further comprising monitoring for creation of the user process on the computer device and establishing the set of registry access rules relevant to the user process in response to creation of the user process.

3. The method of claim 2, further comprising registering, by the registry filter driver, a process creation notification with the operating system.

4. The method of claim 1, wherein the user process relates to a registry editing tool.

5. The method of claim 1, wherein the user process relates to a remote registry service used to manage the registry from a remote computer device.

6. The method of claim 1, further comprising:
    monitoring a plurality of user processes on the computer device; and
    establishing the set of registry access rules uniquely for each of the plurality of user processes, respectively.

7. The method of claim 1, further comprising messaging a service on the computer device and in response receiving the set of registry access rules relevant to the user process.

8. The method of claim 1, further comprising gathering meta-information related to the user process comprising at least a process identity or a process name, and determining the set of registry access rules relevant to the user process based on the meta-information.

9. The method of claim 1, further comprising performing application control to determine whether or not the user process should be allowed to execute on the computing device, and establishing the set of registry access rules relevant to the user process after performing the application control.

10. The method of claim 1, wherein the set of registry access rules comprises at least one of:
a block type rule which causes access to a particular key to be denied prior to reaching the registry; and
an elevate type rule which enables access in relation to a particular key.

11. The method of claim 1, wherein each registry access rule in the set has a defined scope relating to any of: a particular key tree, a particular key, or only to particular named values.

12. The method of claim 1, wherein the registry operation is intended to query or modify a particular key within the registry.

13. The method of claim 1, further comprising performing custom messaging in relation to the registry operation requested by the user process according to the set of registry access rules relevant to the user process.

14. The method of claim 1, further comprising:
generating a custom message comprising a challenge-response; and
receiving a validation code to authenticate a user account associated with the user process, wherein performing the evaluation is further based on authenticating the user account.

15. A system, comprising:
a memory;
at least one computing device in communication with the memory; and
a registry driver, wherein the at least one computing device is configured to execute the registry driver to:
monitor a user process on the at least one computer device;
determine a set of registry access rules relevant to the user process;
perform an evaluation of a registry operation requested by the user process based on the set of registry access rules;
generate a custom message comprising a challenge-response;
receive a validation code to authenticate a user account associated with the user process; and
determine an action based on the evaluation and on authenticating the user account, wherein the action comprises at least one of:
blocking the registry operation in relation to a particular key in a registry of an operating system, and
enabling access to a particular key in the registry of the operating system to perform the registry operation requested by the user process.

16. The system of claim 15, wherein the custom message is presented in a terminal from which the registry operation was invoked.

17. The system of claim 15, wherein the at least one computing device is further configured to query a policy service for a policy file associated with the user process based on meta-data in relation to the user process, wherein the policy file comprises the set of registry access rules.

18. A non-transitory computer-readable medium embodying a registry driver that, when executed by at least one computing device, causes the at least one computing device to:
monitor a user process on the at least one computer device;
determine a set of registry access rules relevant to the user process by querying a policy service for a policy file associated with the user process based on meta-data in relation to the user process, wherein the policy file comprises the set of registry access rules;
perform an evaluation of a registry operation requested by the user process based on the set of registry access rules; and
determine an action based on the evaluation, wherein the action comprises at least one of:
blocking the registry operation in relation to a particular key in a registry of an operating system, and
enabling access to a particular key in the registry of the operating system to perform the registry operation requested by the user process.

19. The non-transitory computer-readable medium of claim 18, wherein the registry driver further causes the at least one computing device to determine whether to allow the user process to run prior to monitoring the user process.

20. The non-transitory computer-readable medium of claim 18, wherein the registry driver further causes the at least one computing device to:
generate a custom message comprising a challenge-response; and
receive a validation code to authenticate a user account associated with the user process, wherein performing the evaluation is further based on authenticating the user account.

* * * * *